United States Patent [19]

Kane

[11] Patent Number: 4,639,045
[45] Date of Patent: Jan. 27, 1987

[54] TRUCK WHEEL LUG NUT PROTECTOR APPARATUS

[76] Inventor: Timothy J. Kane, 1200 Greenfield, Arcadia, Calif. 91006

[21] Appl. No.: 793,328

[22] Filed: Oct. 29, 1985

[51] Int. Cl.$^4$ ............................ B60B 7/02; B60B 7/06
[52] U.S. Cl. ................................. 301/37 S; 301/108 S
[58] Field of Search .............. 301/37 R, 37 S, 37 CD, 301/37 C, 108 S

[56] References Cited

U.S. PATENT DOCUMENTS

| | | |
|---|---|---|
| 1,985,681 | 12/1934 | Miller ............................... 301/108 S |
| 2,133,454 | 10/1938 | Hunt ................................... 301/37 S |
| 2,231,183 | 2/1941 | Flandes .......................... 301/63 DS |
| 2,237,481 | 4/1941 | Ferro . |
| 2,291,597 | 8/1942 | Goeske . |
| 2,631,895 | 3/1953 | Hunt . |
| 3,018,856 | 1/1962 | Lyon ............................. 301/37 R X |
| 4,054,323 | 10/1977 | Lewis . |

FOREIGN PATENT DOCUMENTS

| | | | |
|---|---|---|---|
| 454919 | 3/1949 | Canada ............................ 301/108 S |
| 256843 | 1/1928 | Italy .................................. 301/37 S |
| 265448 | 6/1929 | Italy ............................... 301/37 CD |
| 263882 | 4/1927 | United Kingdom .............. 301/37 S |

*Primary Examiner*—David A. Scherbel
*Attorney, Agent, or Firm*—William W. Haefliger

[57] ABSTRACT

Protection apparatus for lug nuts on a truck wheel, the nuts spaced about a central wheel axis and attached to bolts, includes:

(a) at least two clips retained to the wheel, each clip including a base retained to the wheel by two lug nuts, and a flange extending outwardly away from the base and in spaced relation to said nuts, and (b) a cover having a skirt removably attached to said flanges, the skirt protectively surrounding said lug nuts and bolts.

5 Claims, 4 Drawing Figures

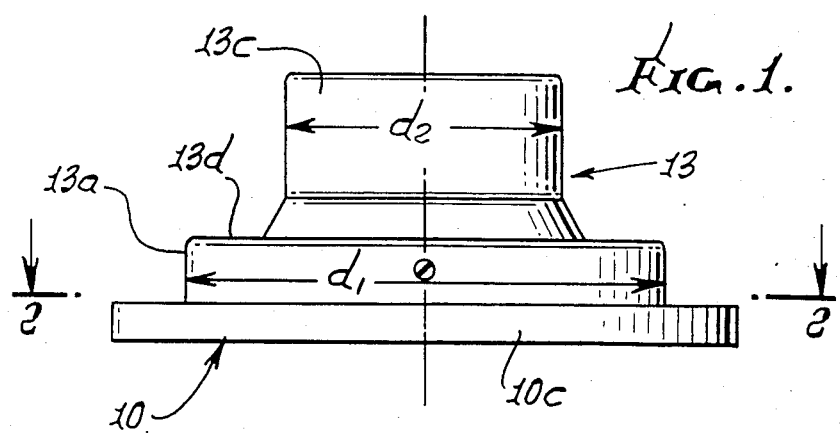
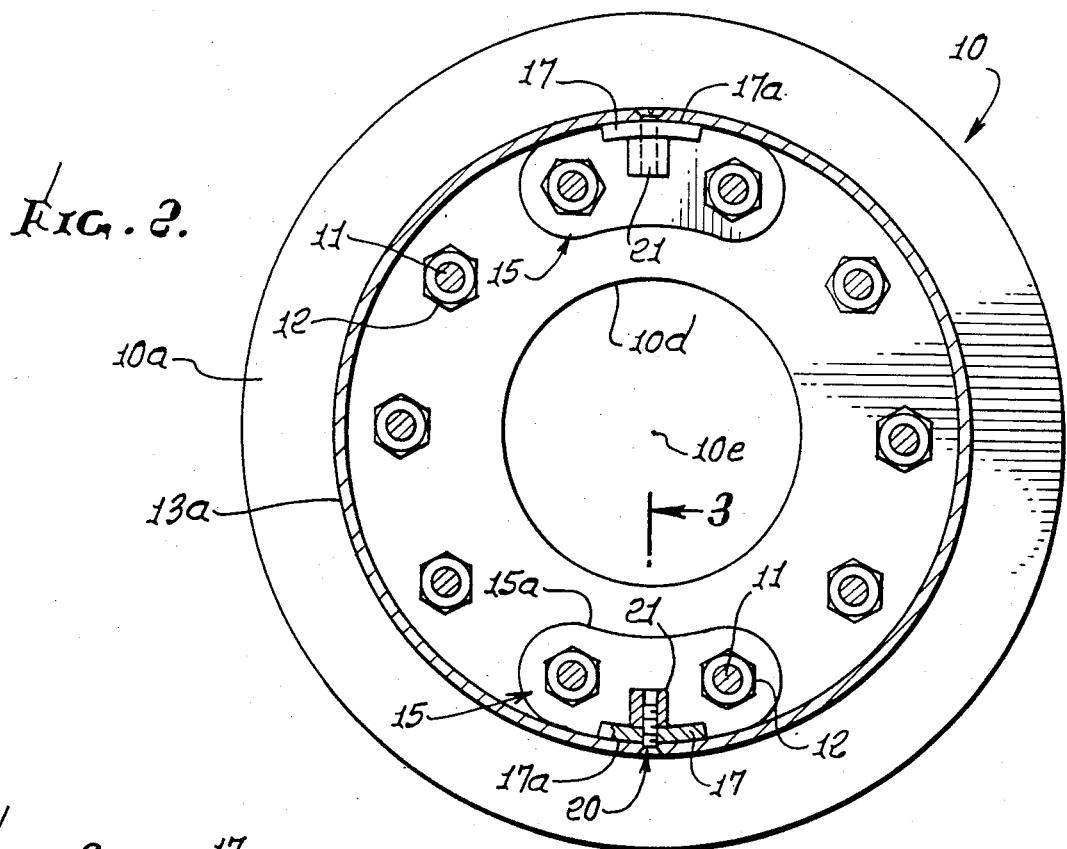
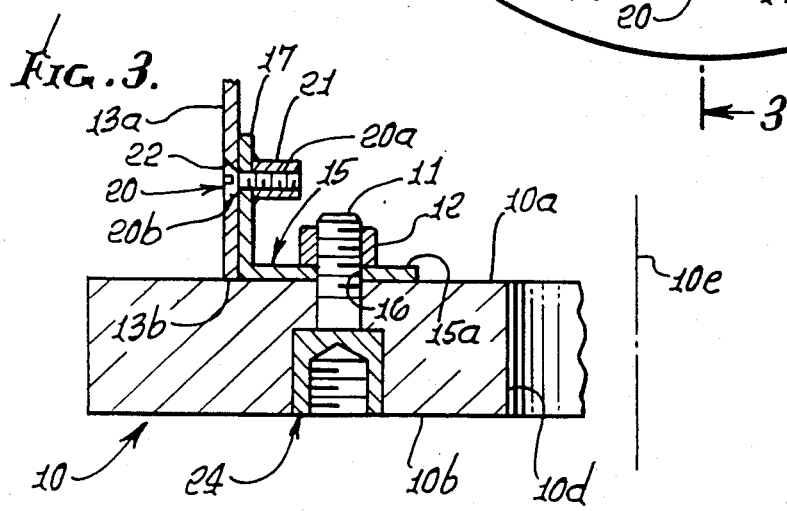
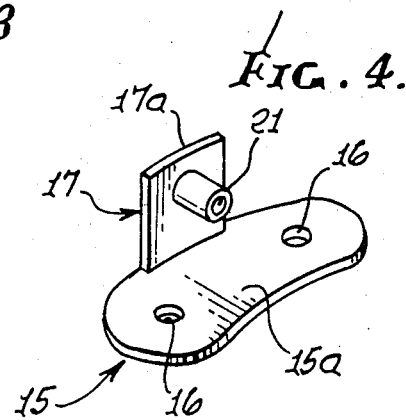

TRUCK WHEEL LUG NUT PROTECTOR APPARATUS

BACKGROUND OF THE INVENTION

This invention relates generally to truck wheels, and more particularly to the protection of wheel retaining bolts and nuts.

Conventionally, the bolts and lug nuts that hold truck wheels to axle structure are sufficiently exposed to the exterior that they are subject to corrosion and rusting due to contact with water, road de-icing salt, and other contaminants. This condition can result in serious weakening of wheel retention to axle structure and can lead to wheel cracking and fracturing, in use. While individual protectors for each bolt and nut combination have been proposed, they require individual removal when the lug nuts are to be removed or tightened, and wheel hub covers can be damaged by wrenches applied to the lug nuts. Applicant herein has perceived the need for a wheel cover that is easily attachable to existing truck wheel, and which will protect the lug nuts and bolts against contact with corrosive road salt, water and contaminants.

SUMMARY OF THE INVENTION

It is a major object of the invention to provide simple and effective structure meeting the above need, and which is easily attachable to existing truck wheels, and removable therefrom to expose all the lug nuts for loosening or tightening.

Basically, the protective apparatus of the invention comprises:

(a) at least two clips retained to the wheel, each clip including a base retained to the wheel by two lug nuts, and a flange extending outwardly away from the base and in spaced relation to said nuts, and (b) a cover having a skirt removably attached to said flanges, said skirt protectively surrounding said lug nuts and bolts.

As will appear, the cover skirt typically also surrounds the clip flanges, and may have frictional, cover positioning engagement with flange curved outer surfaces, the skirt also having a rim that is thereby positioned proximate an annular surface defined by the wheel. The clips are spaced apart about the wheel axis so that the flanges are adapted to position the wheel cover centrally with respect to the wheel axis; and each clip has a base that is attached to and is positioned by at least two bolts, for safety and to cause precise positioning of the clip flange that centers the wheel cover. Further, sleeves are typically attached to the flanges to project generally toward said axis, the sleeves being internally threaded to receive threaded engagement with shanks defined by the fasteners, the fasteners having heads that are tightenable to the skirt, the fastener passing through the skirt and flanges. Also each flange is located at a radius from said axis which exceeds the radii of said studs and nuts, from said axis.

Accordingly, the clips may be easily attached to an existing wheel at positions to mount a wheel cover in protective relation to existing stud bolts and lug nuts; and the wheel cover is easily removable to expose all the lug nuts on a wheel, for tightening or loosening.

These and other objects and advantages of the invention, as well as the details of an illustrative embodiment, will be more fully understood from the following specification and drawings, in which:

DRAWING DESCRIPTION

FIG. 1 is an elevation showing a truck wheel, and cover assembled thereon;

FIG. 2 is an enlarged plan view taken in section on lines 2—2 of FIG. 1;

FIG. 3 is an enlarged fragmentary section taken on lines 3—3 of FIG. 2; and

FIG. 4 is a perspective view of a clip as employed in the apparatus of FIGS. 1-3.

DETAILED DESCRIPTION

In the drawings, a truck wheel 10 is annular and has top and bottom surfaces 10a and 10b, an outer rim 10c, and an inner bore 10d extending about central axis 10e. Stud bolts 11 are carried by the wheel at locations about the axis 10e, and project at the other (upper) side of the wheel. They are normally exposed to the exterior, and consequently are subjected to contact with splattering water, salt, and other substances on the road; consequently, they, together with nuts 12 on the bolts, are subject to chemical attack and deterioration, including rusting and corrosion, since they are unprotected.

In accordance with the invention, a wheel cover 13 is provided at the outer side of the wheel, and has an annular skirt 13a that surrounds the bolts and nuts, and a rim 13b that engages the wheel surface, sealing off to block entry of water, salt, etc. into the space 14 surrounded by the cover. The cover skirt extends cylindrically about axis 10e, and the cover includes a cap 13c joined to skirt 13a by annular wall 13d. The diameter $d_2$ of the cap may be substantially less than the diameter $d_1$ of the skirt.

Also in accordance with the invention at least two clips, as at 15, are retained to the side 10a of the wheel, each clip including a base 15a retained flatly adjacent side 10a by two of the lug nuts 12. If desired, washers may be employed between the nuts and the base. The base has two through openings 16 formed therein to closely pass two studs 11, whereby a flange 17 integral with the base is accurately positioned relative to axis 10e, and relative to the skirt.

Each flange 17 projects upwardly, i.e. outwardly relative to the base, generally at right angles thereto, but is curved along its length (about axis 10e) so that its outer side 17a has curvature matching that of the skirt. Since the clips and flanges are located in substantial spaced apart relation about axis 10e, the inner side wall of the skirt fits closely about and to the outer surfaces 17a of the clip flanges, whereby the wheel cover is accurately centered or positioned relative to axis 10e, so as not to be out of dynamic balance during its rotation at high speed. As shown, the two clips may be located at diametrically opposite sides of axis 10e, and if three clips are employed, they may be located equiangularly about axis 10e.

Fasteners are provided as at 20 to removably attach the skirt to the clip flanges, whereby the skirt is maintained in protective position about the bolts and nuts. As shown, fastener 20 have threaded shanks 20a thread fitted into internally threaded sleeves 21 attached to or integral with the flanges 17, and projecting at the flange inner sides. The fasteners extend through openings 22 in the skirt, and may have heads 20b engaging the skirt outer surface, or countersunk tapers formed in the skirt.

Accordingly, the projecting studs and nuts are completely protected by the cover against water, salt and other contaminants; and the cover is easily removable to gain access to the nuts to permit their removal for removing the wheel off the studs. Note also stud mounting structure 24, normally provided to mount the studs to rotary axle structure.

I claim:

1. In protection apparatus for studs and lug nuts on a truck wheel, and in combination therewith, the nuts spaced about a central wheel axis and attached to bolts, the combination comprising
    (a) two clips retained to the wheel, each clip including a base retained to the wheel by two lug nuts, and a flange extending outwardly away from the base and in spaced relation to said nuts, and
    (b) a cover having a skirt removably attached to said flanges, said skirt protectively surrounding all of said lug nuts and bolts,
    (c) there being at least eight of said lug nuts on at least eight of said studs, each base comprising a plate having two through openings passing two of said studs, the two clips respectively located at diametrically opposite sides of said axis,
    (d) said cover including a first portion defining said skirt which is annular and has an outer diameter $d_1$ and said cover having a cap portion attached to said first portion and projecting axially at one side thereof, said cap portion having a diameter $d_2$ which is substantially less than $d_1$,
    (e) said skirt extending further from said axis than each flange but extending in generally side-by-side relation with each said flange in substantially perpendicular relation to the wheel, and each said flange is located at a radius from said axis which exceeds the radii of said studs and nuts, from said axis,
    (f) the skirt having a rim proximate an annular surface defined by the wheel, and extending radially outwardly of the base defined by each clip, and adjacent the clip flange.

2. The combination of claim 1 including fasteners removably attaching the skirt to said flanges.

3. The combination of claim 2 wherein said skirt fits closely adjacent said flanges.

4. The combination of claim 2 wherein there are sleeves attached to the flanges to project generally toward said axis, the sleeves being internally threaded to receive threaded engagement with shanks defined by the fasteners, the fasteners having heads that are tightenable to the skirt, the fasteners passing through the skirt and flanges.

5. The combination of claim 1 wherein the skirt has frictional engagement with each flange, each flange having curvature matching that of the skirt.

* * * * *